US009509470B2

(12) United States Patent
Janis et al.

(10) Patent No.: US 9,509,470 B2
(45) Date of Patent: Nov. 29, 2016

(54) CYCLIC CHANNEL STATE INFORMATION REFERENCE SIGNAL CONFIGURATION FOR NEW CARRIER TYPE WITH BACKWARD COMPATIBLE SEGMENT

(71) Applicant: Nokia Corporation, Espoo (FI)

(72) Inventors: Pekka Janis, Espoo (FI); Cassio Ribeiro, Espoo (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 130 days.

(21) Appl. No.: 14/383,810

(22) PCT Filed: Mar. 21, 2013

(86) PCT No.: PCT/FI2013/050318
§ 371 (c)(1),
(2) Date: Sep. 8, 2014

(87) PCT Pub. No.: WO2013/140044
PCT Pub. Date: Sep. 26, 2013

(65) Prior Publication Data
US 2015/0117338 A1 Apr. 30, 2015

Related U.S. Application Data

(60) Provisional application No. 61/613,656, filed on Mar. 21, 2012.

(51) Int. Cl.
H04L 5/00 (2006.01)
H04W 24/02 (2009.01)
(Continued)

(52) U.S. Cl.
CPC ........... *H04L 5/0048* (2013.01); *H04L 5/0051* (2013.01); *H04W 24/02* (2013.01); *H04W 72/042* (2013.01); *H04L 5/0091* (2013.01); *H04L 25/0226* (2013.01); *H04L 27/2613* (2013.01)

(58) Field of Classification Search
None
See application file for complete search history.

(56) References Cited

U.S. PATENT DOCUMENTS 9,065,600 B2 * 6/2015 Miao ................. H04L 5/001
(Continued)

FOREIGN PATENT DOCUMENTS

| CN | 102246581 A | 11/2011 |
| WO | 2011/016390 A1 | 2/2011 |
| WO | 2011/075908 A1 | 6/2011 |

OTHER PUBLICATIONS

"3rd Generation Partnership Project; Technical Specification Group Radio Access Network; Evolved Universal Terrestrial Radio Access (E-UTRA); Physical Channels and Modulation(Release 10)", 3GPP TS 36.211, V10.4.0, Dec. 2011, pp. 1-101.
(Continued)

Primary Examiner — Min Jung
(74) Attorney, Agent, or Firm — Nokia Technologies Oy

(57) ABSTRACT

Methods, apparatuses, and computer programs for providing a flexible frequency location for a backwards compatible carrier in a communication system are provided. Embodiments of the invention enable a backwards compatible carrier segment supporting all or a subset of legacy LTE Release transmission modes to be located at an arbitrary position on the system bandwidth (BW) through a cyclic extension of reference signals, such as channel state information reference signals (CSI-RS), and/or other resource element configurations, such as interference measurement reference signals (IMRS), required for supporting PDSCH operation outside the backwards compatible carrier segment.

18 Claims, 6 Drawing Sheets

(51) Int. Cl.
    *H04W 72/04*    (2009.01)
    *H04L 25/02*    (2006.01)
    *H04L 27/26*    (2006.01)

(56) References Cited

U.S. PATENT DOCUMENTS

2011/0002320 A1* 1/2011 Yuk .................. H04W 48/08
                                                  370/338
2013/0195070 A1* 8/2013 Bashar ............... H04W 72/085
                                                  370/330
2013/0250818 A1* 9/2013 Gaal .................... H04W 56/00
                                                  370/277

OTHER PUBLICATIONS

International Search Report and Written Opinion received for corresponding Patent Cooperation Treaty Application No. PCT/FI2013/050318, dated Jun. 20, 2013, 13 pages.

"Additional Carrier Types—Motivations and Issues", 3GPP TSG RAN WG1 Meeting #66, R1-112893, Agenda : 7.2.2, Oct. 10-14, 2011, 6 Pages.

Extended European Search Report received for corresponding European Patent Application No. 13763473.9, dated Nov. 5, 2015, 6 pages.

"Considerations on Unsynchronised New Carrier Types", 3GPP TSG RAN WG1 #68bis, R1-121267, Agenda Item: 7.2.2.1, Nokia Siemens Networks, Mar. 26-30, 2012, 4 pages.

* cited by examiner

CYCLIC CHANNEL STATE INFORMATION REFERENCE SIGNAL CONFIGURATION FOR NEW CARRIER TYPE WITH BACKWARD COMPATIBLE SEGMENT

RELATED APPLICATION

This application was originally filed as Patent Cooperation Treaty Application No. PCT/FI2013/050318 filed Mar. 21, 2013 which claims priority benefit to U.S. Provisional Patent Application No. 61/613,656, filed Mar. 21, 2012.

BACKGROUND

1. Field

Embodiments of the invention relate to wireless communications networks, such as the Universal Mobile Telecommunications System (UMTS) Terrestrial Radio Access Network (UTRAN) and Long Term Evolution (LTE) Evolved UTRAN (E-UTRAN).

2. Description of the Related Art

Universal Mobile Telecommunications System (UMTS) Terrestrial Radio Access Network (UTRAN) refers to a communications network including base stations, or Node Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE is also expected to improve spectral efficiency in 3G networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs.

Further releases of 3GPP LTE (e.g., LTE Rel-10, LTE-Rel-11) are targeted towards future international mobile telecommunications advanced (IMT-A) systems, referred to herein for convenience simply as LTE-Advanced (LTE-A).

A goal of LTE-A is to provide significantly enhanced services by means of higher data rates and lower latency with reduced cost. LTE-A is directed toward extending and optimizing the 3GPP LTE radio access technologies to provide higher data rates at lower cost. LTE-A will be a more optimized radio system fulfilling the international telecommunication union-radio (ITU-R) requirements for IMT-Advanced while keeping the backward compatibility.

SUMMARY

One is directed to a method of providing a flexible frequency location for a backwards compatible carrier in a communication system. The method may include determining, by a node in a communications system, an offset between a center of the communications system bandwidth and a center of a backward compatible carrier segment bandwidth. The method may then include applying the determined offset to obtain reference signals for the communications system bandwidth.

Another embodiment is directed to an apparatus including at least one processor and at least one memory including computer program code. The at least one memory and the computer program code is configured, with the at least one processor to cause the apparatus at least to determine an offset between a center of the communications system bandwidth and a center of a backward compatible carrier segment bandwidth, and apply the determined offset to obtain reference signals (RS) for the communications system bandwidth.

Another embodiment is directed to a computer program embodied on a non-transitory computer readable medium. The computer program is configured to control a processor to perform a process including determining an offset between a center of the communications system bandwidth and a center of a backward compatible carrier segment bandwidth. The process may then include applying the determined offset to obtain reference signals for the communications system bandwidth.

Another embodiment is directed to a method of providing a flexible frequency location for a backwards compatible carrier. The method may include defining, by a node in a communications system, an offset between a center of the communications system bandwidth and a center of a backward compatible carrier segment bandwidth. The defining includes generating reference signals (RS) for the communications system bandwidth taking into account the defined offset. The method may further include indicating the offset to a user equipment.

Another embodiment is directed to an apparatus including at least one processor and at least one memory including computer program code. The at least one memory and the computer program code is configured, with the at least one processor to cause the apparatus at least to define an offset between a center of the communications system bandwidth and a center of a backwards compatible carrier segment band width. The defining of the offset may include generating reference signals (RS) for the communications system bandwidth taking into account the defined offset. The apparatus may be further caused to indicate the offset to a user equipment.

Another embodiment is directed to a computer program embodied on a non-transitory computer readable medium. The computer program is configured to control a processor to perform a process including defining an offset between a center of the communications system bandwidth and a center of a backward compatible carrier segment bandwidth. The defining includes generating reference signals (RS) for the communications system bandwidth taking into account the defined offset. The process may further include indicating the offset to a user equipment.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for providing a flexible frequency location for a backwards compatible carrier as represented in the attached figures, is not intended to limit the scope of the invention, but is merely representative of selected embodiments of the invention.

If desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

The 3rd Generation Partnership Project (3GPP) is standardizing a new carrier type (NCT) for LTE. The new carrier type in 3GPP Release 12 is envisioned as a non-standalone carrier which can be used as a second cell (SCell) through LTE carrier aggregation (CA).

One of the main motivations for the new carrier type is the reduction of legacy channels and signals, which might not be needed on such a carrier in order to reduce the overall system overhead. An option is that the primary synchronization signal (PSS)/secondary synchronization signal (SSS) will remain, but that such a carrier is to have reduced common reference signals (CRS) localized in the frequency domain. For example, the CRS may only be within 1.4 or 5 MHz on a 20 MHz NCT. The transmission of the physical downlink shared channel (PDSCH) can be supported through Channel State Information—Reference Signals (CSI-RS) for channel (CSI) feedback and Demodulation—Reference Signals (DM-RS) for PDSCH demodulation.

Figure 1:
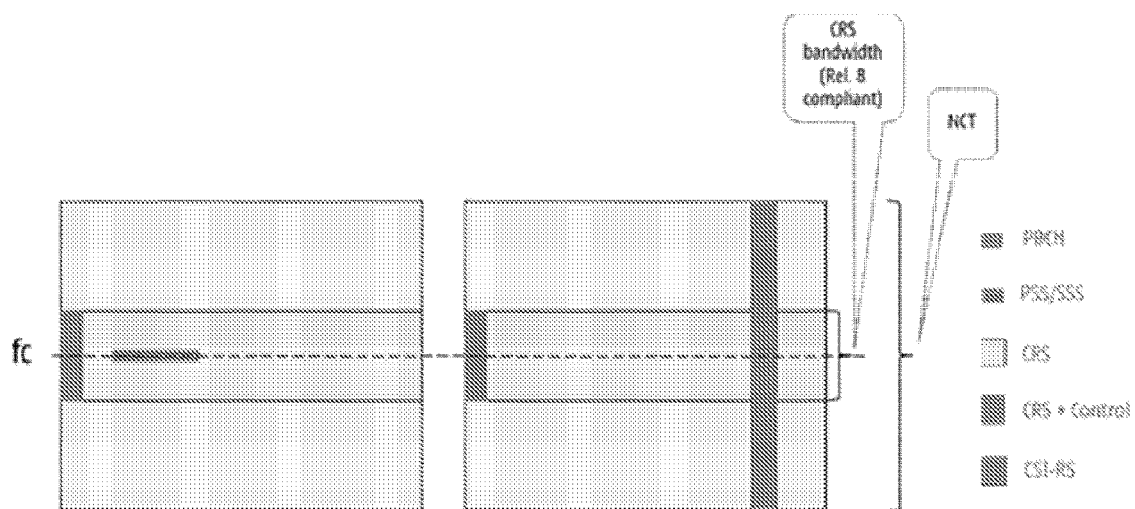
FIG. 1 illustrates an example configuration of the new carrier type (NCT) including a backwards compatible carrier portion, according to one embodiment.

In one embodiment, with reduced frequency domain CRS, it is possible to set up a backward compatible or legacy (e.g., Release 8 to Release 11) carrier segment as a portion of the band, if the physical broadcast channel (PBCH) as well as legacy physical downlink control channel (PDCCH) would be restricted to this (potentially narrowband) backward compatible carrier segment within future (e.g., Release 12) NCT. FIG. 1 illustrates an example configuration of the NCT including a backwards compatible carrier portion, according to one embodiment.

Figure 2:
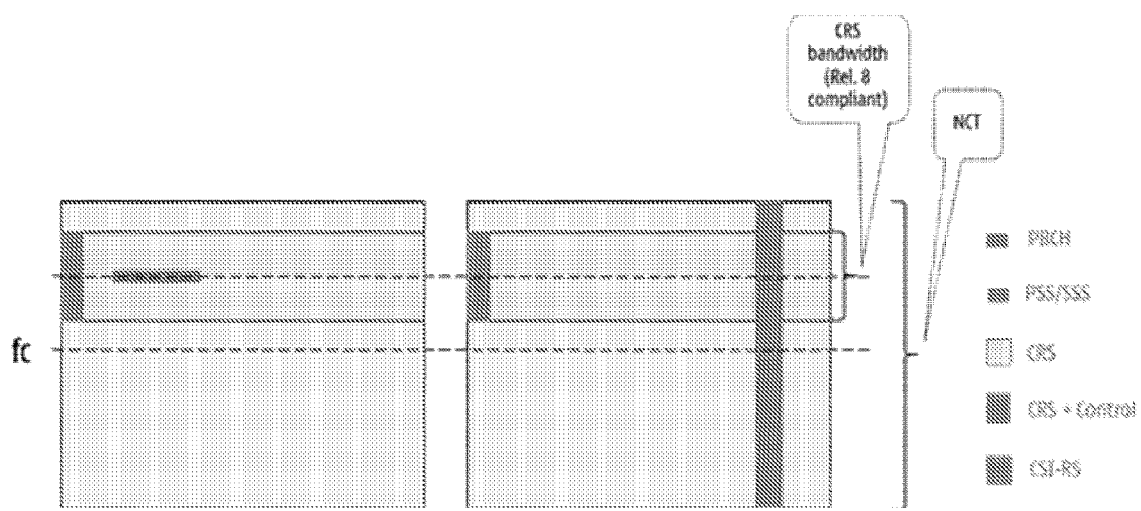
FIG. 2 illustrates an example of an embodiment where the center frequency of the backwards compatible carrier is shifted from the center frequency of the NCT.

According to the configuration illustrated in the embodiment of FIG. 1, all the neighboring cells would have the backwards compatible segment at exactly the same location in frequency, which restricts the application of frequency domain inter-cell interference coordination (ICIC). Additionally, in some cases it may be needed to extend from an already existing legacy carrier such that the backward compatible segment is not located in the center of the NCT. This might occur due to different adjacent band coexistence constraints. For such a setup, a more flexible configuration might be needed. Therefore, FIG. 2 illustrates an example where the backwards compatible carrier segment is not located in the center of the NCT. In other words, in the embodiment illustrated in FIG. 2, the center frequency of the backwards compatible carrier is shifted from the center frequency of the NCT.

Figure 3:
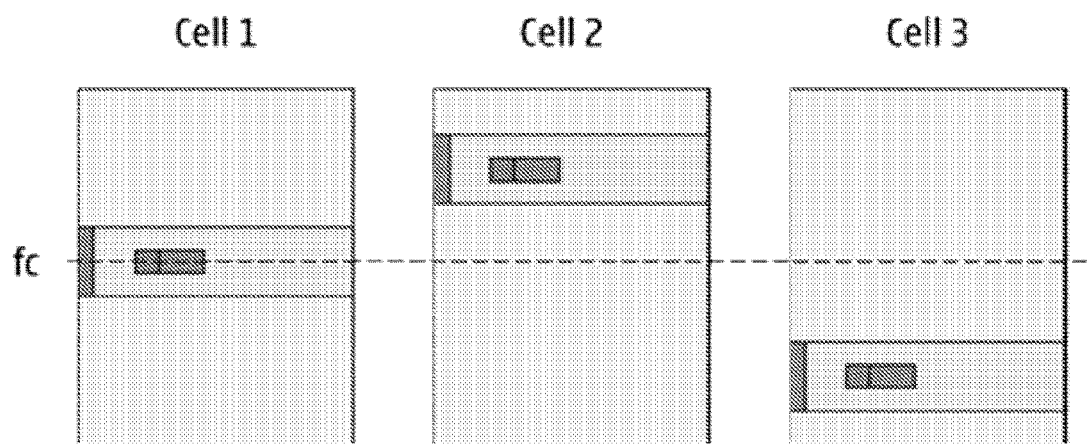
FIG. 3 illustrates an example of flexible frequency location of the backward compatible part, according to an embodiment.

By enabling a more flexible configuration, certain embodiments may allow the network to coordinate the location of the backward compatible carrier segments and, therefore, enable ICIC for common channels, such as PSS/SSS, as well as legacy control, like PDCCH. FIG. 3 illustrates an example of flexible frequency location of the backward compatible part to enable frequency domain inter-cell interference coordination (f-domain ICIC). As illustrated in the example of FIG. 3, the flexible frequency location of the backward compatible part is shown for three cells. However, embodiments are not limited to three cells and can be applied to any number of cells.

The reference signals and resource element configurations required for supporting PDSCH operation outside the backwards compatible carrier segment, for example CSI-RS, DM-RS, and interference measurement resource elements (IMREs), may need to be supported over the full NCT bandwidth, which also includes the backwards compatible, legacy carrier segment. In particular, with CSI-RS being transmitted on all resource blocks in the full bandwidth, the location of the narrow band backwards compatible segment can be exactly in the center of the band. This is because of the specific way CSI-RS sequence is mapped to the physical resource blocks (PRBs), as defined in 3GPP TS 36.211 V10.4.0 (2011-12), sect. 6.10.5.2:

In subframes configured for CSI reference signal transmission, the reference signal sequence $r_{l,n_s}(m)$ shall be mapped to complex-valued modulation symbols $a_{k,l}^{(p)}$ used as reference symbols on antenna port p according to:

$$a_{k,l}^{(p)} = w_{l''} \cdot r_{l,n_s}(m')$$

$$\text{where } k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \cdots, N_{RB}^{DL} - 1$$

$$m' = m + \left\lfloor \frac{N_{RB}^{max,DL} - N_{RB}^{DL}}{2} \right\rfloor$$

Here, m is the PRB index, m' is the index to the reference signal sequence, $N_{RB}^{max,DL}$ is the maximum DL bandwidth in number of PRB, and $N_{RB}^{DL}$ is the system bandwidth assumed by the UE in number of PRB.

Figure 4:
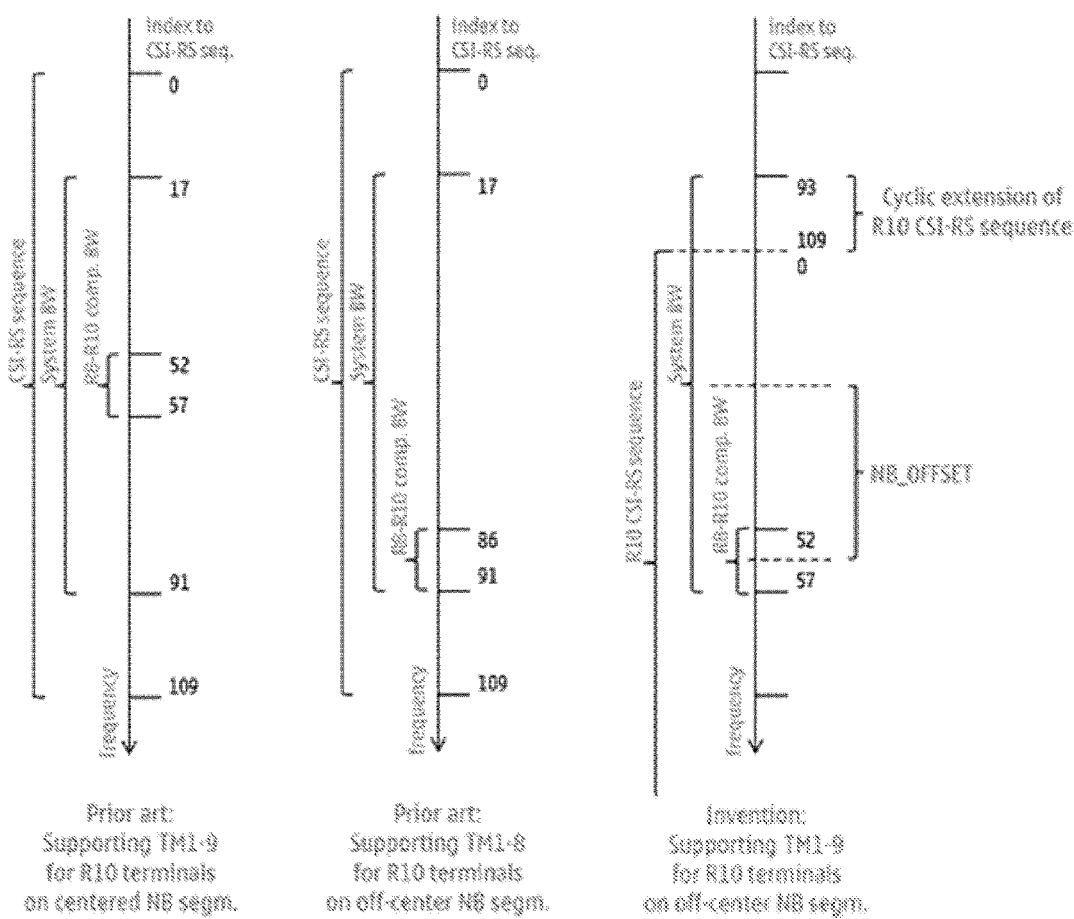
FIG. 4 illustrates the channel state information reference signal (CSI-RS) mapping to physical resource blocks (PRBs), according to an embodiment.

In view of the above, embodiments of the invention enable a backward compatible (e.g., Release 10 or Release 11) compliant (potentially narrow band (NB)) carrier segment supporting transmission mode (TM) 1-9 to be located at an arbitrary position on the system bandwidth (BW), as illustrated in FIG. 2 discussed above, and also illustrated in FIG. 4 discussed below. According to an embodiment, the backward compatible carrier segment is enabled to be located at an arbitrary position by always mapping the CSI-RS to the NB segment according to, for example, Release 10 or Release 11 specifications, as if the system BW was equal to the backward compatible carrier segment BW. For example, FIG. 4 illustrates the CSI-RS mapping to PRBs, with an example of 6 PRB NB segments on 75 PRB carrier. In particular, FIG. 4 illustrates a comparison of an embodiment of the invention supporting TM1-9 for legacy (e.g., Release 10) terminals on off-center NB segment with two prior art examples. In an embodiment, the CSI-RS for the full system BW is obtained by cyclic extension of the legacy, backward compatible (e.g. Release 10) CSI-RS sequence. Thus, certain embodiments of the invention provide the cyclic extension of the backwards compatible (e.g., Release 10) CSI-RS sequence in order to compensate for the offset of NB_OFFSET applied to the CSI-RS sequence. In addition, some embodiments provide indication of NB_OFFSET for Release 12 and later UEs.

According to an example embodiment, in 3GPP TS 36.211 V10.4.0 (2011-12), sect. 6.10.5.2, the mapping may be changed from:

$$m = 0, 1, \cdots, N_{RB}^{DL} - 1$$
$$m' = m + \left\lfloor \frac{N_{RB}^{max,DL} - N_{RB}^{DL}}{2} \right\rfloor$$

to: 
$$m = 0, 1, \cdots, N_{RB}^{DL} - 1$$
$$m' = \mathrm{mod}\left(m + \left\lfloor \frac{N_{RB}^{max,DL} - N_{RB}^{DL}}{2} \right\rfloor - \mathrm{NB\_OFFSET}, N_{RB}^{max,DL}\right)$$
(1)

where NB_OFFSET may indicate the offset in PRBs of the NB segment PRBs relative to the center of the system band allocation.

In an embodiment, the NB_OFFSET may be signaled either implicitly or explicitly to the UE as part of the signaling indicating the system bandwidth of the NCT. Such signaling might be carried on the master information block (MIB) as part of the PBCH or on the system information block (SIB) on the common search space of PDCCH on the backward compatible part. Of course, if the UE is using the NCT only as SCell, the signaling might also be provided by higher layer signaling through the primary cell (PCell). The terminals supporting the NCT will know the mapping as in equation (1).

It should be noted that a similar issue with sequence mapping may also occur with DM-RS as well as potential interference measurement resource elements (IMRE). Since the DM-RS is a UE specific reference signal, the eNB may map the sequence in a UE specific manner according to the standard release of the UE. However, if there is multi-user multiple-in multiple-out (MU-MIMO) or coordinated multi-point (CoMP) transmission between Release 10 and Release 11 UEs, the sequence should be known to both UEs of different standard releases. If such transmission is to be supported, then the DM-RS mapping should be shifted and the sequence cyclically extended, and this may be done in a similar way as is proposed for the CSI-RS as discussed above. A similar issue arises when resource elements utilized for interference measurement purposes (IMREs) are defined in a PRB specific way. For these signals, a similar cyclic extension as explained above for the specific case of CSI-RS can be applied here. Even a similar cyclic extension of CRS could be envisioned as such, enabling more flexible spectrum deployments with legacy UEs operating on legacy, backward compatible carrier also for CRS based transmission modes.

Accordingly, embodiments of the invention enable backward compatible (e.g., Release 10 compliant) carrier segment supporting also TM9 to be located at an arbitrary position on the system BW enabling the envisioned frequency domain ICIC.

Figure 6:
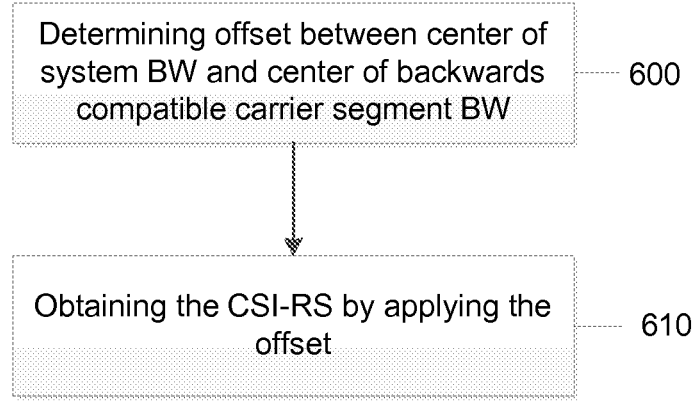
FIG. 6 illustrates a flow chart of a method, according to one embodiment.

As illustrated in FIG. 6, one embodiment is directed to a method of providing a flexible frequency location for a backwards compatible carrier in a communication system, such as LTE. In some embodiments, the method can be performed on the side of the communication system, such as by an evolved Node B (eNB), and/or can be performed by the UE. The method enables a backward compatible, legacy carrier segment to be located at an arbitrary position on the system bandwidth (BW). The method includes, at 600, determining an offset between the center of the system BW and the center of the NB segment BW. In an example embodiment, the determining of an offset may include receiving an indication of the offset from the eNB. The method may also include, at 610, obtaining the CSI-RS for the full system BW by applying the determined offset. As such, embodiments can compensate for the offset of NB_OFFSET applied to the CSI-RS sequence.

Figure 7:
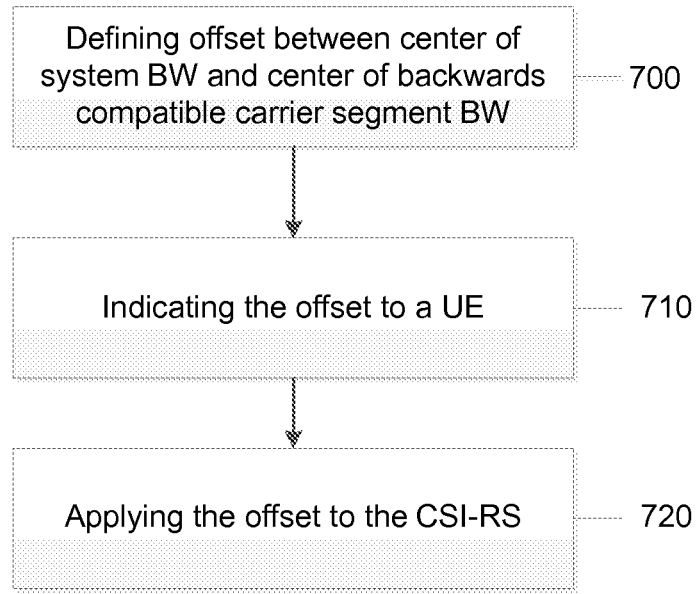
FIG. 7 illustrates a flow chart of a method, according to one embodiment.

FIG. 7 illustrates an example of a flow chart for a method of providing a flexible frequency location for a backwards compatible carrier. In one embodiment, the method of FIG. 7 may be performed by an eNB. The method includes, at 700, defining an offset between the center of the system BW and the center of the legacy, backward compatible carrier segment BW. The method may then include, at 710, indicating the offset to a UE, such as a future (e.g., Release 12) UE. The method may further include, at 720, applying the offset to the CSI-RS for the full system BW. As mentioned earlier, the offset can also be applied in a similar manner to demodulation reference signals (DM-RS), interference measurement purposes (IMREs) as well as even cell-specific reference signals (CRS).

In some embodiments, the functionality of any of the methods described herein may be implemented by a software stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

Figure 5:
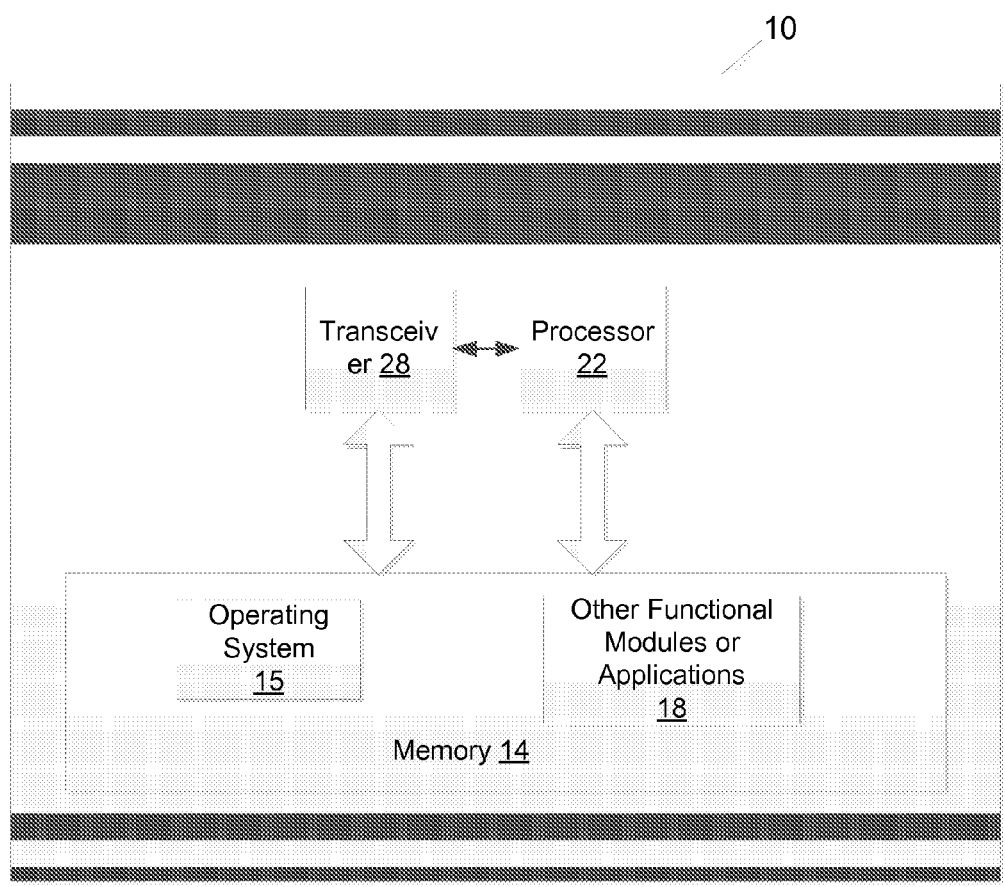
FIG. 5 illustrates an apparatus, according to one embodiment.

FIG. 5 illustrates an apparatus 10 according to another embodiment. In an embodiment, apparatus 10 may be an eNB or UE configured to provide a flexible frequency location for a backwards compatible carrier. Apparatus 10 includes a processor 22 for processing information and executing instructions or operations. Processor 22 may be any type of general or specific purpose processor. While a single processor 22 is shown in FIG. 5, multiple processors may be utilized according to other embodiments. In fact, processor 22 may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as examples.

Apparatus 10 further includes a memory 14, coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory ("RAM"), read only memory ("ROM"), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas (not shown) for transmitting and receiving signals and/or data to and from apparatus 10. Apparatus 10 may further include a transceiver 28 that modulates information on to a carrier waveform for transmission by the antenna(s) and demodulates information received via the antenna(s) for further processing by other elements of apparatus 10. In other embodiments, transceiver 28 may be capable of transmitting and receiving signals or data directly.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include an operating system 15 that provides operating system functionality for apparatus 10. The memory may also store one or more functional modules 18, such as an application or program, to provide additional functionality for apparatus 10. The components of apparatus 10 may be implemented in hardware, or as any suitable combination of hardware and software.

According to one embodiment, apparatus 10 may be controlled by memory 14 and processor 22 to provide a flexible frequency location for a backwards compatible carrier in a communication system, such as LTE. Apparatus 10 may be configured to enable a narrow band (NB) carrier segment to be located at an arbitrary position on the system bandwidth (BW). In particular, apparatus 10 may be controlled by memory 14 and processor 22 to map the CSI-RS to the backward compatible carrier segment according to legacy (e.g., Release 10 or Release 11) specifications, as if the overall system BW was equal to the backward compatible segment BW. Apparatus 10 may be configured to carry out the mapping using equation (1) discussed above. Apparatus 10 may also be controlled to obtain the CSI-RS for the full system BW by cyclic extension of the legacy (e.g., Release 10 or Release 11) CSI-RS sequence. As such, apparatus 10 can be configured to compensate for the offset of NB_OFFSET applied to the CSI-RS sequence. A similar approach can be also taken for demodulation reference signals (DM-RS), interference measurement purposes (IMREs) as well as even cell-specific reference signals (CRS).

The described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising: determining, by a node in a communications system, an offset between a center of the communications system bandwidth and a center of a backwards compatible carrier segment bandwidth; and applying the determined offset to obtain reference signals (RS) for the communications system bandwidth, wherein when the sequence of reference signals is mapped to complex-valued modulation symbols used as reference symbols, the index to the reference signal sequence m' and the physical resource block (PRB) index m are defined as $$m = 0, 1, \cdots, N_{RB}^{DL} - 1$$

$$m' = \mathrm{mod}\!\left(m + \left\lfloor \frac{N_{RB}^{max,DL} - N_{RB}^{DL}}{2} \right\rfloor - \mathrm{NB\_OFFSET}, N_{RB}^{max,DL}\right)$$

where $N_{RB}^{max,DL}$ is the maximum downlink (DL) bandwidth in number of PRB, $N_{RB}^{DL}$ is the system bandwidth assumed in number of PRB, and NB_OFFSET is the determined offset in number of PRB.

2. The method according to claim 1, wherein the determining of the offset comprises receiving an indication of the offset from an evolved node B (eNB).

3. The method according to claim 2, wherein the receiving comprises receiving the indication on a master information block (MIB) as part of a physical broadcast channel (PBCH).

4. The method according to claim 2, wherein the receiving comprises receiving the indication on a system information block (SIB) on a common search space of a physical downlink control channel (PDCCH).

5. The method according to claim 1, wherein the reference signals (RS) comprise channel state information reference signals (CSI-RS).

6. The method according to claim 1, wherein the reference signals (RS) comprise one of: demodulation reference signals (DM-RS), cell specific reference signals (CRS), or interference measurement reference signals (IMRS).

7. An apparatus, comprising: at least one processor; and at least one memory comprising computer program code, the at least one memory and the computer program code configured, with the at least one processor, to cause the apparatus at least to determine an offset between a center of the communications system bandwidth and a center of a backwards compatible carrier segment bandwidth; and apply the determined offset to obtain reference signals (RS) for the communications system bandwidth, wherein when the sequence of reference signals is mapped to complex-valued modulation symbols used as reference symbols, the index to the reference signal sequence m' and the physical resource block (PRB) index m are defined as $$m = 0, 1, \ldots, N_{RB}^{DL} - 1$$
$$m' = \mod\left(m + \left\lfloor \frac{N_{RB}^{max,DL} - N_{RB}^{DL}}{2} \right\rfloor - \text{NB\_OFFSET}, N_{RB}^{max,DL}\right),$$

where $N_{RB}^{max,DL}$ is the maximum downlink (DL) bandwidth in number of PRB, $N_{RB}^{DL}$ is the system bandwidth assumed in number of PRB, and NB_OFFSET is the determined offset in number of PRB.

8. The apparatus according to claim 7, wherein the at least one memory and the computer program code are further configured, with the at least one processor, to cause the apparatus to receive an indication of the offset from an evolved node B (eNB).

9. The apparatus according to claim 8, wherein the at least one memory and the computer program code are further configured, with the at least one processor, to cause the apparatus to receive the indication on a master information block (MIB) as part of a physical broadcast channel (PBCH).

10. The apparatus according to claim 8, wherein the at least one memory and the computer program code are further configured, with the at least one processor, to cause the apparatus to receive the indication on a system information block (SIB) on a common search space of a physical downlink control channel (PDCCH).

11. The apparatus according to claim 7, wherein the reference signals (RS) comprise channel state information reference signals (CSI-RS).

12. The apparatus according to claim 7, wherein the reference signals (RS) comprise one of: demodulation reference signals (DM-RS), cell specific reference signals (CRS), or interference measurement reference signals (IMRS).

13. A method, comprising: defining, by a node in a communications system, an offset between a center of the communications system bandwidth and a center of backwards compatible carrier segment bandwidth; generating reference signals (RS) for the communications system bandwidth taking into account the defined offset; and indicating the offset to a user equipment, wherein when the sequence of reference signals is mapped to complex-valued modulation symbols used as reference symbols, the index to the reference signal sequence m' and the physical resource block (PRB) index m are defined as $$m = 0, 1, \ldots, N_{RB}^{DL} - 1$$
$$m' = \mod\left(m + \left\lfloor \frac{N_{RB}^{max,DL} - N_{RB}^{DL}}{2} \right\rfloor - \text{NB\_OFFSET}, N_{RB}^{max,DL}\right),$$

where $N_{RB}^{max,DL}$ is the maximum downlink (DL) bandwidth in number of PRB, $N_{RB}^{DL}$ is the system bandwidth assumed in number of PRB, and NB_OFFSET is the defined offset in number of PRB.

14. The method according to claim 13, further comprising applying the offset to the reference signals for the full system bandwidth.

15. The method according to claim 13, wherein the reference signals (RS) comprise channel state information reference signals (CSI-RS).

16. The method according to claim 13, wherein the reference signals (RS) comprise one of: demodulation reference signals (DM-RS), cell specific reference signals (CRS), or interference measurement reference signals (IMRS).

17. An apparatus, comprising: at least one processor; and at least one memory comprising computer program code, the at least one memory and the computer program code configured, with the at least one processor, to cause the apparatus at least to define an offset between a center of the communications system bandwidth and a center of a backwards compatible carrier segment bandwidth; generate reference signals (RS) for the communications system bandwidth taking into account the defined offset; and indicate the offset to a user equipment, wherein when the sequence of reference signals is mapped to complex-valued modulation symbols used as reference symbols, the index to the reference signal sequence m' and the physical resource block (PRB) index m are defined as $$m = 0, 1, \ldots, N_{RB}^{DL} - 1$$
$$m' = \mod\left(m + \left\lfloor \frac{N_{RB}^{max,DL} - N_{RB}^{DL}}{2} \right\rfloor - \text{NB\_OFFSET}, N_{RB}^{max,DL}\right),$$

where $N_{RB}^{max,DL}$ is the maximum downlink (DL) bandwidth in number of PRB, $N_{RB}^{DL}$ is the system bandwidth assumed in number of PRB, and NB_OFFSET is the defined offset in number of PRB.

18. A computer readable memory storing a program of instructions which when executed by at least one processor cause an apparatus to perform: determining, by a node in a communications system, an offset between a center of the communications system bandwidth and a center of a backwards compatible carrier segment bandwidth; and applying the determined offset to obtain reference signals (RS) for the communications system bandwidth, wherein when the sequence of reference signals is mapped to complex-valued modulation symbols used as reference symbols, the index to the reference signal sequence m' and the physical resource block (PRB) index m are defined as $$m = 0, 1, \ldots, N_{RB}^{DL} - 1$$
$$m' = \mod\left(m + \left\lfloor \frac{N_{RB}^{max,DL} - N_{RB}^{DL}}{2} \right\rfloor - \text{NB\_OFFSET}, N_{RB}^{max,DL}\right),$$

where $N_{RB}^{max,DL}$ is the maximum downlink (DL) bandwidth in number of PRB, $N_{RB}^{DL}$ is the system bandwidth assumed in number of PRB, and NB_OFFSET is the determined offset in number of PRB.

* * * * *